US011926150B2

(12) United States Patent
Nieda

(10) Patent No.: US 11,926,150 B2
(45) Date of Patent: Mar. 12, 2024

(54) SHEET STACKING APPARATUS, PRINTING APPARATUS, CONTROL METHOD, AND STORAGE MEDIUM

(71) Applicant: CANON KABUSHIKI KAISHA, Tokyo (JP)

(72) Inventor: Kengo Nieda, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 17/552,585

(22) Filed: Dec. 16, 2021

(65) Prior Publication Data

US 2022/0194105 A1 Jun. 23, 2022

(30) Foreign Application Priority Data

Dec. 22, 2020 (JP) ................................ 2020-212773

(51) Int. Cl.

*B65H 33/06* (2006.01)
*B41J 13/00* (2006.01)
*B65H 33/16* (2006.01)
*B65H 43/06* (2006.01)

(52) U.S. Cl.

CPC .......... *B41J 13/0045* (2013.01); *B65H 33/16* (2013.01); *B65H 43/06* (2013.01); *B65H 2513/51* (2013.01)

(58) Field of Classification Search

CPC .. B41J 13/0045; B65H 31/3054; B65H 43/06; B65H 33/12; B65H 33/16
See application file for complete search history.

(56) References Cited

U.S. PATENT DOCUMENTS

| | | | | | |
|---|---|---|---|---|---|
| 1,693,632 | A * | 12/1928 | Zuckerman | B65H 33/16 | 414/790 |
| 3,724,640 | A * | 4/1973 | Rapparlie | B65H 31/32 | 271/213 |
| 3,752,043 | A * | 8/1973 | Rapparlie | B65H 33/16 | 414/794.4 |
| 5,704,604 | A * | 1/1998 | Koelle | B65H 29/6636 | 270/52.09 |
| 8,028,981 | B2 * | 10/2011 | Graushar | B42C 19/04 | 270/58.29 |

(Continued)

FOREIGN PATENT DOCUMENTS

| | | | |
|---|---|---|---|
| JP | 10161292 | A * | 6/1998 |
| JP | H10-161292 | A | 6/1998 |

(Continued)

OTHER PUBLICATIONS

Extended European Search Report dated Oct. 31, 2022, in European Patent Application No. 21214410.9.

*Primary Examiner* — Patrick H Mackey
(74) *Attorney, Agent, or Firm* — Venable LLP

(57) ABSTRACT

A sheet stacking apparatus is provided. A conveyor unit performs stacking of sheets discharged from a printing apparatus and conveying of stacked sheets. A detection unit detects whether or not the printing apparatus is currently discharging a sheet. A control unit, so as to secure a stacking space for a sheet discharged from the printing apparatus on the conveyor unit, controls a feeding operation of the conveyor unit correspondingly to a period of time over which the detection unit detected that the printing apparatus is discharging a sheet.

6 Claims, 5 Drawing Sheets

(56) References Cited

U.S. PATENT DOCUMENTS

| | | | | |
|---|---|---|---|---|
| 8,925,713 B2 * | 1/2015 | Dax | B65H 33/12 | 198/418.7 |
| 2015/0210500 A1 * | 7/2015 | Salamone | B65H 33/12 | 271/190 |

FOREIGN PATENT DOCUMENTS

| | | |
|---|---|---|
| JP | 2007-008687 A | 1/2007 |
| JP | 2013-249161 A | 12/2013 |

* cited by examiner

SHEET STACKING APPARATUS, PRINTING APPARATUS, CONTROL METHOD, AND STORAGE MEDIUM

BACKGROUND OF THE INVENTION

Field of the Invention

The present invention relates to a sheet stacking apparatus, a printing apparatus, a control method, and a storage medium.

Description of the Related Art

Conventionally, a printing apparatus having a sheet stacking apparatus for stacking printed sheets discharged from the apparatus housing is known. In Japanese Patent Laid-Open No. 2013-249161, it is disclosed that a grip unit for holding the stacked sheet bundle is provided at predetermined intervals on a conveyor which is a sheet stacking unit. Further, it discloses that in order to improve visibility of a stacked sheet bundle, a sheet bundle for each job is held by a grip unit and the conveyor is moved by a predetermined amount.

SUMMARY OF THE INVENTION

According to an embodiment of the present invention, there is provided a sheet stacking apparatus comprising: a conveyor unit configured to perform stacking of sheets discharged from a printing apparatus and conveying of stacked sheets; a detection unit configured to detect whether or not the printing apparatus is currently discharging a sheet; and a control unit configured to, so as to secure a stacking space for a sheet discharged from the printing apparatus on the conveyor unit, control a feeding operation of the conveyor unit correspondingly to a period of time over which the detection unit detected that the printing apparatus is discharging a sheet.

According to another embodiment of the present invention, there is provided a printing apparatus comprising: a printing unit configured to print on a sheet; a discharge unit configured to a sheet printed by the printing unit from a casing of the printing apparatus, a conveyor unit configured to perform stacking of sheets discharged from the casing by the discharge unit and conveying of stacked sheets; a detection unit configured to detect whether or not the discharge unit is currently discharging a sheet; and a control unit configured to, so as to secure a stacking space for a sheet discharged from the casing by the discharging unit on the conveyor unit, control a feeding operation of the conveyor unit correspondingly to a period of time over which the detection unit detected that the printing apparatus is discharging a sheet.

According to still another embodiment of the present invention, there is provided a control method for a sheet stacking apparatus including a conveyor unit configured to perform stacking of sheets discharged from a printing apparatus and conveying of stacked sheets and a detection unit configured to detect whether or not the printing apparatus is currently discharging a sheet, comprising: a controlling, so as to secure a stacking space for a sheet discharged from the printing apparatus on the conveyor unit, a feeding operation of the conveyor unit correspondingly to a period of time over which the detection unit detected that the printing apparatus is discharging a sheet.

According to still yet another embodiment of the present invention, there is provided a non-transitory computer-readable storage medium storing a computer program for causing a control method performed by a sheet stacking apparatus including a conveyor unit configured to perform stacking of sheets discharged from a printing apparatus and conveying of stacked sheets and a detection unit configured to detect whether or not the printing apparatus is currently discharging a sheet, the method comprising: a controlling, so as to secure a stacking space for a sheet discharged from the printing apparatus on the conveyor unit, a feeding operation of the conveyor unit correspondingly to a period of time over which the detection unit detected that the printing apparatus is discharging a sheet.

Further features of the present invention will become apparent from the following description of exemplary embodiments (with reference to the attached drawings).

DESCRIPTION OF THE EMBODIMENTS

Figure 1:
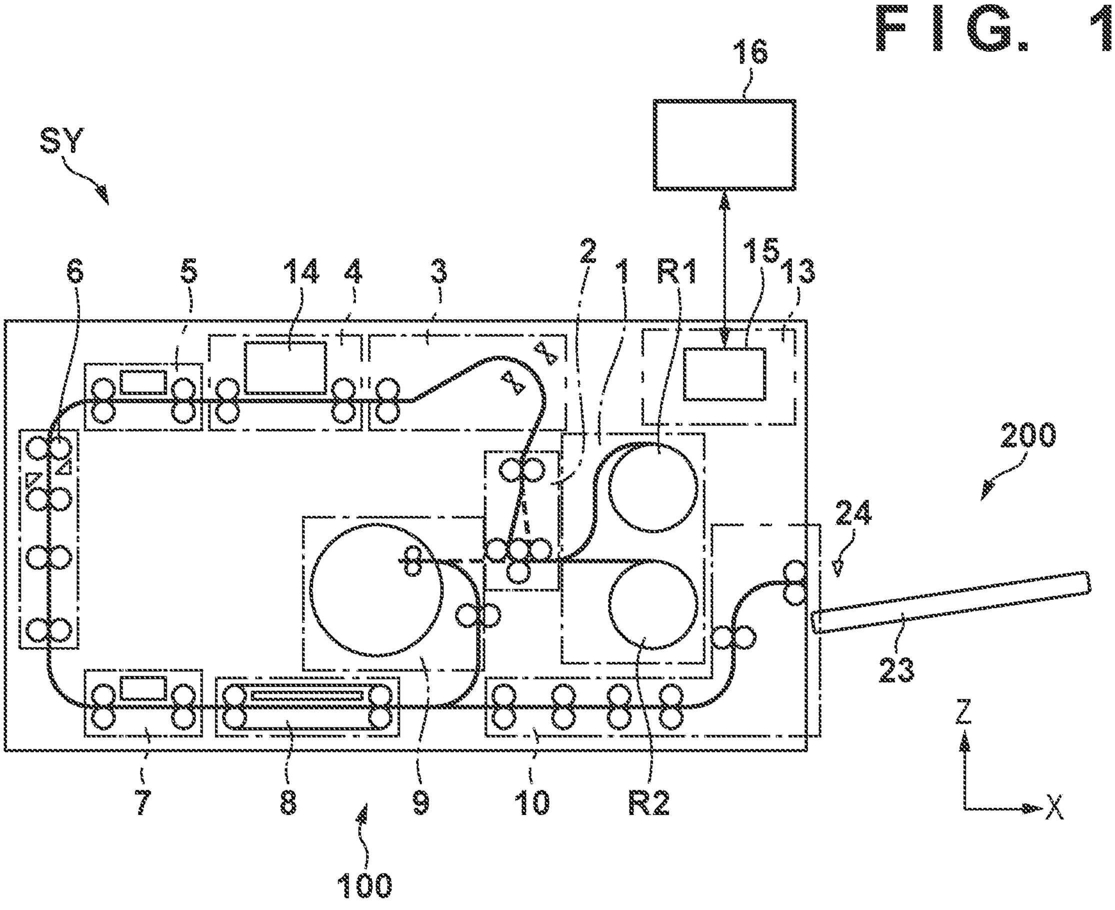
FIG. 1 is a diagram schematically illustrating the internal structure of a printing system according to an embodiment.

In the above prior art, since the distance between the grip units is fixed, when the discharged sheets are shorter than the distance between the grip units, the distance between adjacent sheet bundles is larger, and the number of sheets that can be stacked on the stacking unit is lower. On the other hand, when the discharged sheets are longer than the interval between the grip units, adjacent sheet bundles overlap with each other, and the workability of retrieving the sheet bundles may suffer.

Embodiments of the present invention provide a technique by which it is possible to stack a larger number of sheets while reducing diminished workability in retrieval of sheet bundles.

Hereinafter, embodiments will be described in detail with reference to the attached drawings. Note, the following embodiments are not intended to limit the scope of the claimed invention. Multiple features are described in the embodiments, but limitation is not made an invention that requires all such features, and multiple such features may be combined as appropriate. Furthermore, in the attached drawings, the same reference numerals are given to the same or similar configurations, and redundant description thereof is omitted.

In this specification, the term "printing" (sometimes referred to as "recording") is not limited to the case of forming meaningful information such as characters, graphics, and the like, and also may be the case of forming meaningless information. Furthermore, “print” broadly encompasses cases in which an image or pattern is formed on a print medium irrespective of whether or not it is something that a person can visually perceive, and cases in which a medium is processed.

In addition, the “print medium” is not limited to paper used in a general printing apparatus, but broadly represents something that can receive ink such as cloth, plastic film, metal plate, glass, ceramics, wood, leather, and the like.

In addition, “ink” (sometimes referred to as “liquid”) should be construed broadly similarly to the above definition for “printing”. Accordingly, “ink” encompasses liquids that by being applied to a print medium can be supplied in the forming of images, patterns or the like, processing of print mediums, or processing of ink (for example, insolubilization or freezing of a colorant in ink applied to a print medium).

Furthermore, unless otherwise specified, the term “nozzle” generally refers to an ejection port or a liquid path communicating therewith, and an element for generating energy used for ink ejection.

<Overview of Printing System>

FIG. 1 is a diagram schematically illustrating the internal structure of a printing system SY according to an embodiment. The printing system SY of the present embodiment is a high-speed ink jet type line printer which uses a continuous sheet wound in a roll shape and supports both single-sided printing and double-sided printing. The printing system SY can be used in the field of large-volume printing in a photo printing lab, for example, or the like.

The printing system SY includes a printing apparatus 100 and a sheet stacking apparatus 200. The printing apparatus 100 includes a sheet supply unit 1, a curl correction unit 2, a skew correction unit 3, a printing unit 4, an inspection unit 5, a cutter unit 6, an information printing unit 7, a drying unit 8, a winding unit 9, a discharge unit 10, and a control unit 13. The sheet is conveyed by a conveyance mechanism including a roller pair, a belt, and a motor for driving the rollers along a sheet conveyance path indicated by a solid line in the drawing, and processing is performed by each unit.

The sheet supply unit 1 is a unit for accommodating the continuous sheet wound in a roll shape (roll sheet) as well as supplying to the conveyance path by pulling out the stored continuous sheet. In the present embodiment, the sheet supply unit 1 can accommodate two rolls R1 and R2, and is configured to alternatively draw out and supply a sheet. It should be noted that the number of rolls that the sheet supply unit 1 can accommodate is not limited to two, and a configuration in which the sheet supply unit 1 accommodates one roll, or three or more rolls can be adopted.

The curl correction unit 2 is a unit for reducing the curl (warpage) of a sheet supplied from the sheet supply unit 1. In the present embodiment, the curl correction unit 2 reduces curl by bending the sheet so as to curve in the opposite direction of the curl and squeeze it by using two pinch rollers with respect to one driving roller.

The skew correction unit 3 is a unit for correcting skew (inclination with respect to the original traveling direction) of the sheet passing through the curl correction unit 2. For example, skew correction unit 3 corrects a skewed sheet by pressing, against a guide member, one end, which is to serve as a reference, of the two sheet ends in the width direction that intersects the sheet conveyance direction.

The printing unit 4 is a unit for printing an image on a conveyed sheet. For example, the printing unit 4 includes a print head unit 14 and a plurality conveyance rollers which are conveyance members for conveying sheets.

The print head unit 14 of the present embodiment includes a plurality of print heads, and each print head is formed with an ink-jet nozzle row in a range covering the maximum width of sheet to be used. In this embodiment, a plurality of print heads are arranged in parallel along the conveyance direction. As an example, the print head unit 14 includes seven print heads corresponding to seven colors of C (cyan), M (magenta), Y (yellow), LC (light cyan), LM (light magenta), G (gray), and K (black). The number of colors of ink and the number of print heads are not limited to seven, and may be changed as appropriate.

As the method by which the print head ejects ink, a method using a heating element, a method using a piezo element, a method using an electrostatic element, a method using a MEMS element, or the like can be adopted. The inks of the respective colors are supplied from, for example, ink tanks to the print head unit 14 via ink tubes.

The inspection unit 5 is a unit for inspecting the state of the nozzle of the print head, the sheet conveyance state, the image position, and the like by optically reading the inspection pattern or the image printed on the sheet by the printing unit 4. The cutter unit 6 is a unit provided with a mechanical cutter for cutting the sheet after printing to a predetermined length. The information printing unit 7 is a unit that prints printing information such as a serial number and a date of printing on the back side of the cut sheet. The drying unit 8 is a unit which heats the sheet printed by the printing unit 4 to dry the imparted ink in a short time. Each of the inspection unit 5, the cutter unit 6, the information printing unit 7, and the drying unit 8 may include a conveyance belt or a conveyance roller for feeding the sheet to the next process.

The winding unit 9 is a unit that temporarily winds up a continuous sheet on which front-side printing is finished when the double-sided printing is performed. The winding unit 9 is provided with a rotating take-up drum for winding the sheet. The specific operation of the winding unit 9 at the time of double-sided printing will be described later.

The discharge unit 10 is a unit for conveying the sheet cut by the cutter unit 6 and dried by the drying unit 8, discharging the sheet from the printing apparatus 100, and transferring the sheet to the sheet stacking apparatus 200. The specific configuration of the discharge unit 10 will be described later.

The control unit 13 is a unit that controls each unit of the printing apparatus 100. The control unit 13 may include, for example, a processor represented by a CPU, a RAM, a memory such as a ROM, a controller 15 including various interfaces such as an I/O interface or a communication interface, and a power supply.

The controller 15 controls the operation of the printing apparatus 100 based on the received instruction. For example, the controller 15 acquires an instruction from a user received by an operation unit such as an operation panel provided in a housing of the printing apparatus 100 via an I/O interface, and controls the operation of the printing apparatus 100 based on the content thereof. For example, the controller 15 is controlled based on an instruction received from an external device 16 such as a host computer connected via a communication interface.

The sheet stacking apparatus 200 stacks sheets discharged from the discharge unit 10 of the printing apparatus 100. The sheet stacking apparatus 200 may be configured to be detachable from the printing apparatus 100. For example, the sheet discharge tray provided in the printing apparatus 100 may be removed, and the sheet stacking apparatus 200 may be added to the discharge unit 10. The specific configuration of the sheet stacking apparatus 200 will be described later.

Printing System Operation Example

Next, the basic operation of the printing system SY at the time of printing will be described. Hereinafter, operations of single-sided printing and double-sided printing will be described respectively.

Figure 2:
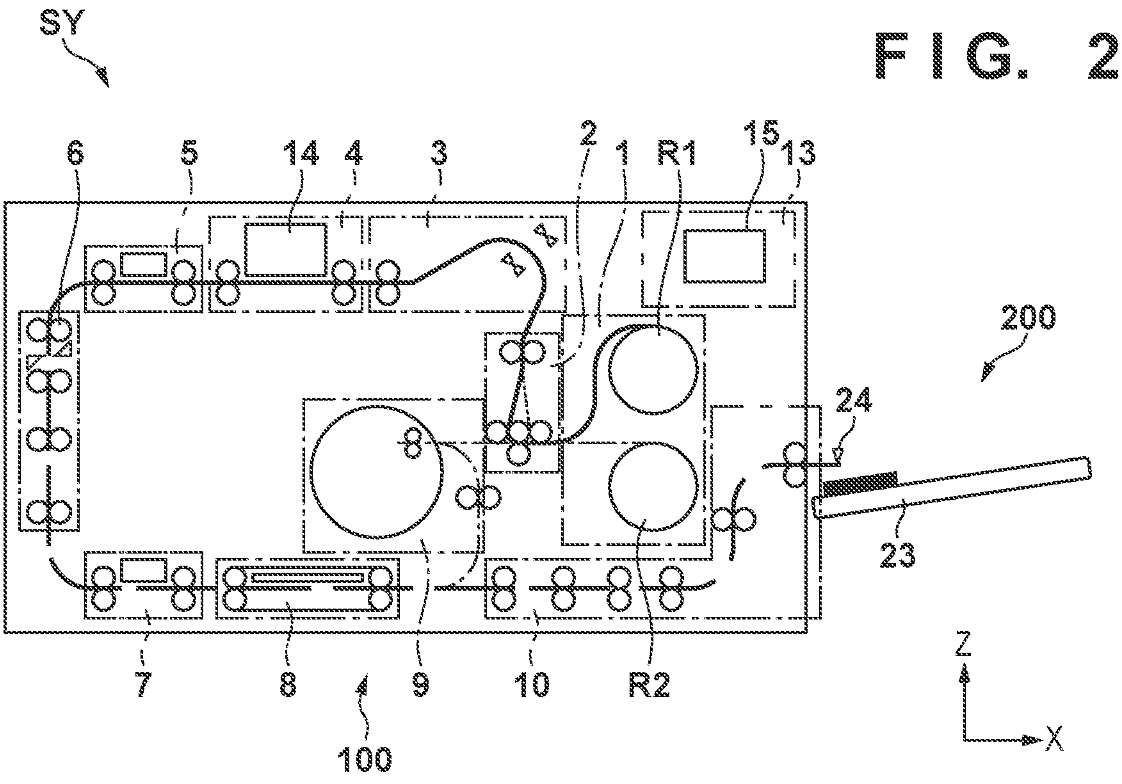
FIG. 2 is a diagram for explaining an operation of the printing system during single-sided printing.

FIG. 2 is a diagram for explaining an operation of the printing system SY during single-sided printing. In FIG. 2, the sheet on the conveyance path is illustrated by a thick solid line. Sheets fed from the sheet supply unit 1 on the conveyance path and processed by the curl correction unit 2 and the skew correction unit 3 respectively are printed on the front side in the printing unit 4. After passing through the inspection unit 5, the sheet printed by the printing unit 4 is cut by the cutter unit 6 for each predetermined unit length which is set in advance. Next, in the information printing unit 7, the printing information is printed on the back side of the cut sheet as necessary. Then, cut sheets are conveyed one by one to the drying unit 8 to dry the ink. Thereafter, the sheets are discharged from the discharge unit 10 to outside of the printing apparatus 100 and are sequentially stacked on the sheet stacking apparatus 200.

Figure 3:
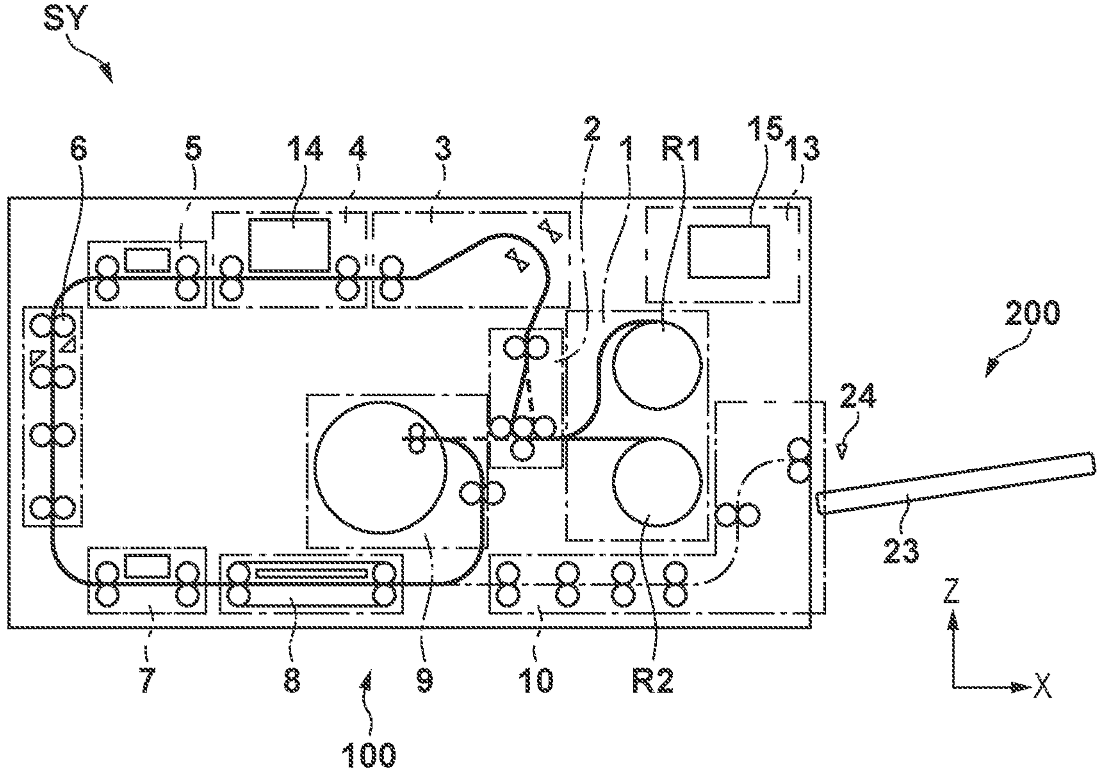
FIG. 3 is a diagram for explaining an operation of the printing system during double-sided printing.

FIG. 3 is a diagram for explaining an operation of the printing system SY during double-sided printing. In double-sided printing, a back side printing sequence is performed following the front side printing sequence. In FIG. 3, a continuous sheet conveyed to the winding unit 9 by the front side printing sequence is illustrated by a thick solid line.

In a first front side printing sequence, the operation in each unit from the sheet supply unit 1 to the inspection unit 5 is the same as the operation of the above-described single-sided printing, but in the cutter unit 6, the cutting operation is not performed and the continuous sheet is conveyed to the drying unit 8 as is. After the ink on the front side dries in the drying unit 8, the continuous sheet is introduced into the path on the side of the winding unit 9, rather than the path on the side of the discharge unit 10. The introduced sheet is wound on the take-up drum of the winding unit 9 which rotates in the forward direction (counterclockwise direction in the drawing). When the printing of all scheduled front sides is finished in the printing unit 4, the trailing end of the printing area of the continuous sheet is cut in the cutter unit 6. With reference to the cutting position, the continuous sheet on the downstream side in the conveyance direction (the side on which printing has been performed) passes through the drying unit 8 and is completely wound up to the trailing end (the cutting position) of the sheet by the winding unit 9. Meanwhile, the continuous sheet upstream of the cutting position in the conveyance direction is rewound to the sheet supply unit 1 so that the leading end (cutting position) of the sheet does not remain in the curl correction unit 2.

Back side printing sequence is performed following the foregoing front side printing sequence. In FIG. 3, a portion of the conveyance path of the continuous sheet at the time of the back side printing sequence from the winding unit 9 to the curl correction unit 2 is illustrated by a thick broken line. The take-up drum of the winding unit 9 rotates in the opposite direction (clockwise direction in the drawing) to the time of winding. Then, the end of the wound sheet is fed into the curl correction unit 2 in a state in which the front and back of the continuous sheet is inverted. Incidentally, the leading end of the sheet fed into curl correction unit 2 at this time is the trailing end of the sheet at the time of winding. That is, the leading end and the trailing end of the sheet are switched between the time of front-side printing and the time of the back-side printing. In the curl correction unit 2, straightening a curl in the opposite direction is performed at the time of front-side printing. This is because a sheet wound on a take-up drum is wound so as to be front/back inverted with the roll in the sheet supply unit 1, and is curled in the opposite direction. Thereafter, printing is performed on the back side of the continuous sheet by the printing unit 4 through the skew correction unit 3. After passing through the inspection unit 5, the printed sheet is cut by the cutter unit 6 for each predetermined unit length which is set in advance. Since the cut sheet is printed on both sides, printing by the information printing unit 7 is not performed. Cut sheets are conveyed one by one to the drying unit 8, discharged to the outside of the printing apparatus 100, and sequentially stacked onto the sheet stacking apparatus 200 from the discharge unit 10.

<Configuration of Discharge Unit and Sheet Stacking Apparatus>

Figure 4:
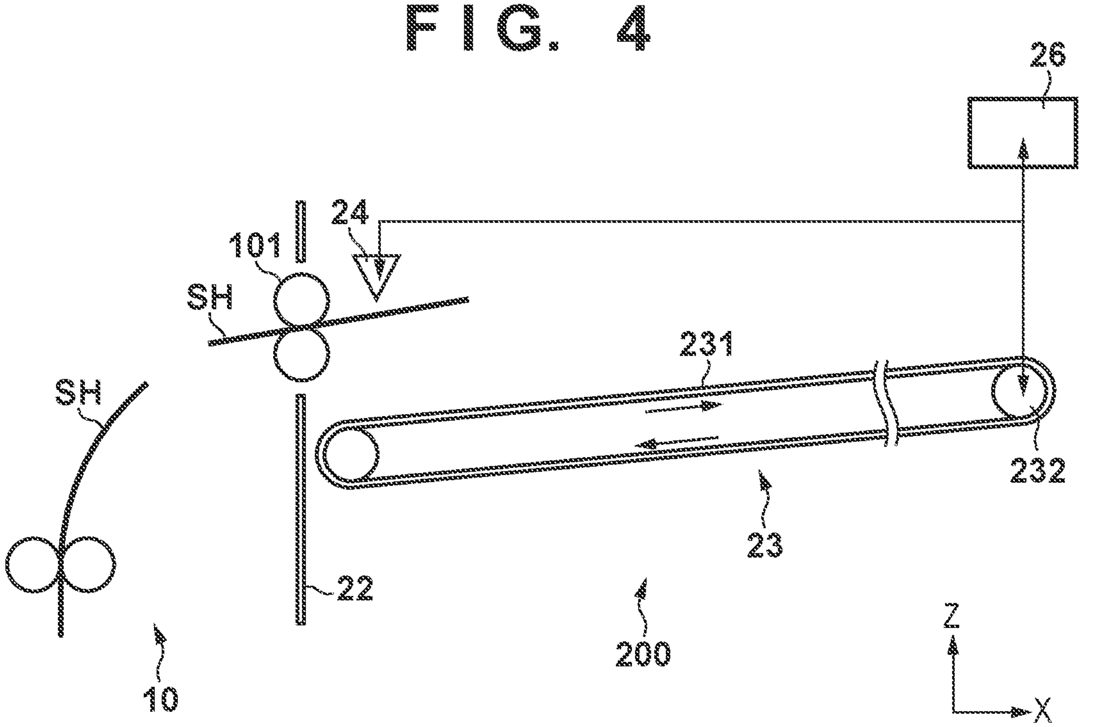
FIG. 4 is a diagram illustrating a configuration around the discharge unit and the sheet stacking apparatus.

FIG. 4 is a diagram illustrating a configuration around the discharge unit 10 and the sheet stacking apparatus 200.

The discharge unit 10 includes a discharge roller 101 at the most downstream in the conveyance direction. The discharge roller 101 is rotated by, for example, a motor (not illustrated). The discharge roller 101 discharges the sheet from a discharge opening 102 formed in the casing of the printing apparatus 100.

The sheet stacking apparatus 200 includes a conveyor unit 23, a sheet detection sensor 24 and a conveyor control unit 26.

The conveyor unit 23 carries out the stacking of sheets discharged from the discharge unit 10 of the printing apparatus 100 and the conveying of the stacked sheets. The conveyor unit 23 is provided below the discharge opening 102 of the discharge unit 10 (-Z direction). The conveyor unit 23 includes a conveyor belt 231 and a conveyor driving roller 232.

The conveyor belt 231 is an endless belt forming a sheet stacking surface. In the present embodiment, the sheet stacking surface is formed so as to extend from a position close to the printing apparatus 100 below the discharge opening 102 in the X direction and the Z direction. In other words, the sheet stacking surface formed by the conveyor belt 231 is inclined upward downstream in the direction in which sheets stacked on the conveyor belt 231 are conveyed. This inclination is provided so that the sheets stacked on the conveyor belt 231 are caused to be aligned by the aligning unit 22, as will be described later. Incidentally, the inclination may be set, for example, at an angle of 5 to 30 degrees in consideration of the performance of sheet stacking alignment by the aligning unit 22 and the performance of sheet stacking alignment when a later-described feeding operation is performed.

Further, the length of the sheet stacking surface formed by the conveyor belt 231 in the conveyance direction may be set to be longer than the maximum sheet length that the printing apparatus 100 can discharge, for example.

Here, in the present embodiment, a part of an exterior member of the printing apparatus 100 functions as the aligning unit 22 to align the sheets stacked on the conveyor unit 23. Specifically, sheets discharged from the printing apparatus 100 are moved to the printing apparatus 100 side by the inclination of the sheet stacking surface, and the sheets stacked on the conveyor unit 23 are aligned by the end that is upstream in the direction in which sheets are discharged abutting the aligning unit 22. However, the aligning unit 22 may be a member provided separately from the exterior member of the printing apparatus 100. For example, the sheet stacking apparatus 200 may include a member that regulates the movement of the sheet by the inclination of the sheet stacking surface.

The sheet detection sensor 24 detects whether or not the printing apparatus 100 is currently discharging a sheet. In the present embodiment, the sheet detection sensor 24 is positioned downstream of the discharge roller 101 in the discharging direction. In the present embodiment, the sheet detection sensor 24 turns on when a sheet discharged from the discharge roller 101 is present at the detection position of the sheet detection sensor 24, and turns off when the sheet is not present at the detection position. That is, when the sheet is nipped in the discharge roller 101 and is being discharged, the sensor turns on, and when the sheet is not being discharged and is away from the nip of the discharge roller 101, the sensor turns off. As the sheet detection sensor 24, a well-known sensor such as a photoelectric sensor, a laser sensor, an ultrasonic sensor, or a capacitance sensor can be employed as appropriate.

The conveyor driving roller 232 drives the conveyor belt 231 in accordance with a conveyor driving motor (not illustrated).

The conveyor control unit 26, by controlling the driving of the conveyor driving roller 232, controls a feeding operation of the conveyor unit 23. For example, the conveyor control unit 26 may include a processor as typified by a CPU, a RAM, a memory such as a ROM, a controller including various interfaces such as an I/O interface or a communication interface, and a power supply.

The conveyor control unit 26 controls the driving of the conveyor driving roller 232 based on speed information of the sheet discharged from the discharge unit 10, discharge interval information for sheets of the same print job discharged from the discharge unit 10, or information from the sheet detection sensor 24. For example, the conveyor control unit 26 acquires the sheet speed information and the sheet discharge interval information by receiving input from a user through an operation unit (not illustrated) provided on the sheet stacking apparatus 200. Further, for example, the conveyor control unit 26 acquires the sheet speed information and the sheet discharge interval information by receiving them from the control unit 13 of the printing apparatus 100. The sheet speed information received by the conveyor control unit 26 from the printing apparatus 100 may be a set value or may be a value measured by an encoder or the like provided on the discharge roller 101.

Further, the print job may be, for example, data including instructions, image data, setting information, and the like for causing the printing apparatus 100 to execute print processing. The printing apparatus 100 can discharge one or more cut sheets from the discharge unit 10 based on the same print job.

Further, in the present embodiment, the conveyor control unit 26 manages the execution state (job status) of the print job based on the detection result of the sheet detection sensor 24 as the information from the sheet detection sensor 24. For example, the CPU of the conveyor control unit 26 determines the job status from the detection result of the sheet detection sensor 24, and stores the determination result in the memory of the conveyor control unit 26 as the job status. In the present embodiment, according to the flowchart of FIG. 5, which will be described later, it is determined whether the job status is “continuing” indicating that the print job is being executed or “finished” indicating that the print job is not being executed. The job status managed by the conveyor control unit 26 is determined by the conveyor control unit 26 only based on the detection result of the sheet detection sensor 24, and it is possible that it does not coincide with the execution state of the print job in the processing performed by the control unit 13 of the printing apparatus 100.

Next, the behavior of a sheet when the sheet is stacked on the sheet stacking apparatus 200 will be described.

A sheet discharged from the discharge roller 101 falls onto the conveyor belt 231 due to gravity. The sheet that has fallen onto the conveyor belt 231 moves toward the printing apparatus 100 due to the inclination of the sheet stacking surface of the conveyor belt 231, the end of the sheet hits the aligning unit 22, and the movement stops. In such a movement, a sheet discharged from the discharge roller 101 is aligned and stacked on the conveyor belt 231 in sequence before the conveyor unit 23 is operated by the conveyor control unit 26.

The conveyor control unit 26 executes a feeding operation of the conveyor unit 23 when the discharging of a sheet from the printing apparatus 100 based on, for example, the same print job is finished. At this time, the conveyor control unit 26 controls the acceleration of the conveyor belt 231 to perform the feeding operation so as not to ruin the performance of stacking alignment for a sheet bundle stacked on the conveyor belt 231. By this feeding operation, it is possible to ensure a sheet stacking space when a sheet is discharged from the printing apparatus 100 based on the next print job. Then, since sheets discharged based on the next print job are stacked on the conveyor belt 231, a plurality of sheet bundles are aligned and stacked on the conveyor belt 231 (see FIG. 6).

Incidentally, in the feeding operation of the conveyor unit 23 described above, if the feed amount is larger than the length of the sheet discharged from the printing apparatus 100 next, the spacing between the sheet bundles may increase, and the number of sheets that the sheet stacking apparatus 200 can stack may be lower. On the other hand, if the feed amount is smaller than the length of the sheet to be next discharged from the printing apparatus 100, adjacent sheet bundles will overlap with each other, and the workability of taking out the sheet bundles may suffer. Therefore, in the present embodiment, the conveyor control unit 26, by the following control, controls the feed amount of the conveyor unit 23.

Control Example

Figure 5A:
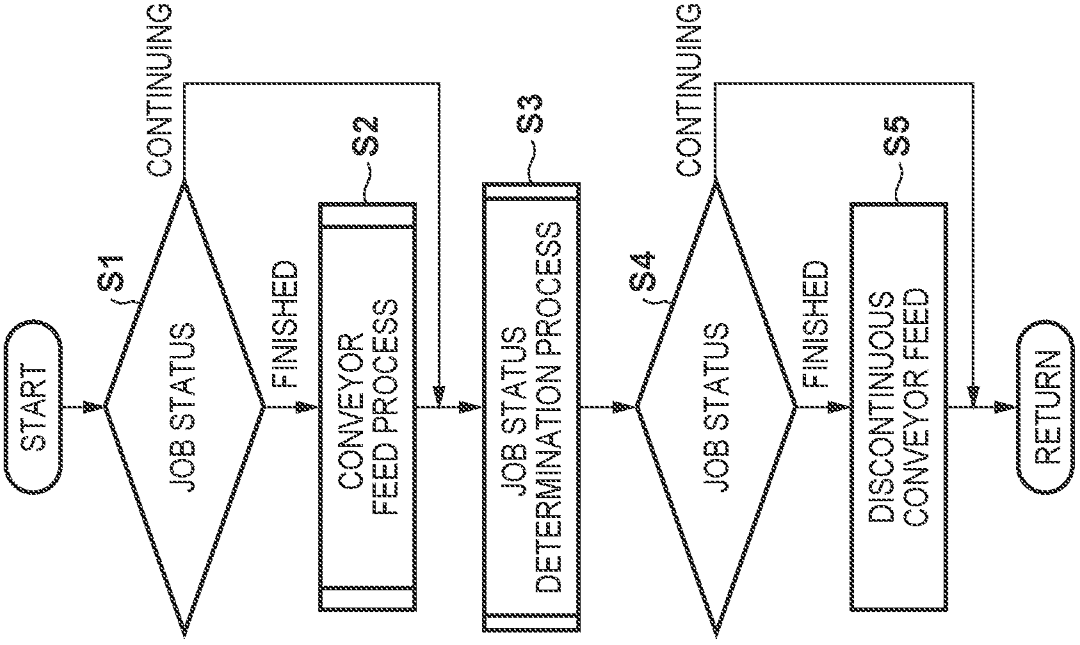
FIG. 5A is a flowchart illustrating a control example of a sheet stacking apparatus.

FIG. 5A is a flowchart illustrating a control example of the sheet stacking apparatus 200. This flowchart is realized, for example, by the CPU of the conveyor control unit 26 reading a program stored in the ROM into the RAM and executing the program.

Figure 6:
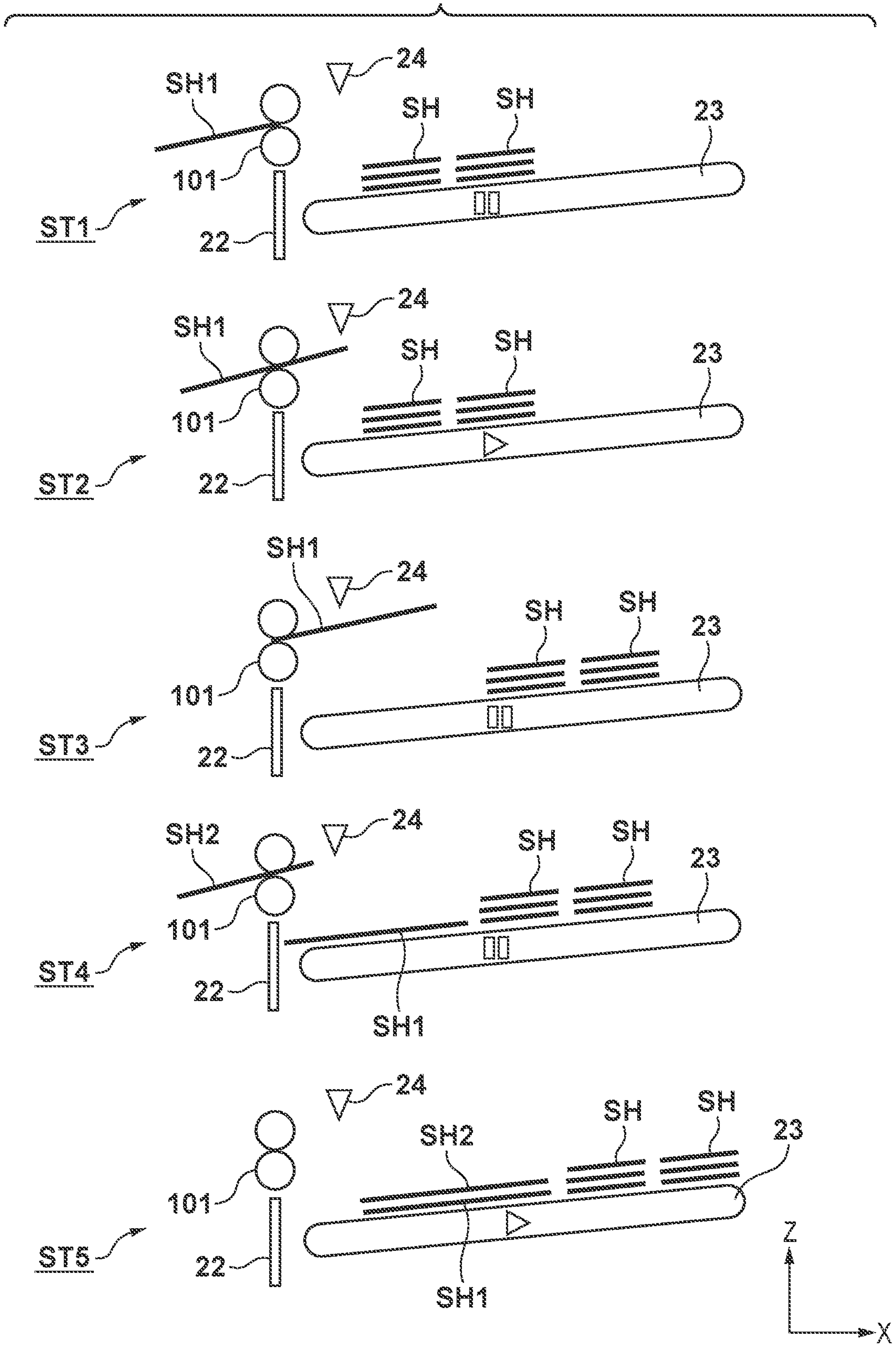
FIG. 6 is a figure illustrating an example of an operation of the sheet stacking apparatus.

Further, FIG. 6 is a diagram illustrating an operation example of the sheet stacking apparatus 200, and illustrates an operation example for when the flowchart of FIG. 5A is executed. FIG. 6 illustrates an example of operation of the sheet stacking apparatus 200 when subsequent sheet SH1 and sheet SH2 are discharged from the printing apparatus 100 in a state in which two sheet bundles are already stacked on the conveyor unit 23. In the following explanation, it is assumed that the sheet SH1 and the sheet SH2 are sheets which are to be discharged based on a print job subsequent to the print job when the sheet bundle on the left as illustrated in state ST1 or the like of FIG. 6 which is stacked on the conveyor unit 23 has been discharged. Therefore, in the state ST1 of FIG. 6, the job status is "finished".

In step S1, the conveyor control unit 26 confirms the job status, and proceeds to step S2 if the job status is "finished", and proceeds to S3 if the job status is "continuing". For example, the conveyor control unit 26 reads out information about the job status stored in the memory and performs confirmation. In the case of FIG. 6, since the job status in the status ST1 is "finished" as described above, the conveyor control unit 26 proceeds to S2.

In step S2, the conveyor control unit 26 executes a conveyor feed process. In the case where the job status is "finished", the print job when the sheets stacked on the conveyor belt 231 are discharged is finished, and therefore, the next sheet to be discharged from the discharge unit 10 will be the first sheet based on the next print job. On the other hand, when the job status is "continuing", the next sheet to be discharged from the discharge unit 10 will be the second sheet or a later sheet based on the currently ongoing print job. Therefore, in the present embodiment, by the branching in step S1, a conveyor feed process is executed to discharge the first sheet of a print job, but the conveyor feed process is not executed for the discharge of the second and subsequent sheets of the same print job.

Figure 5B:
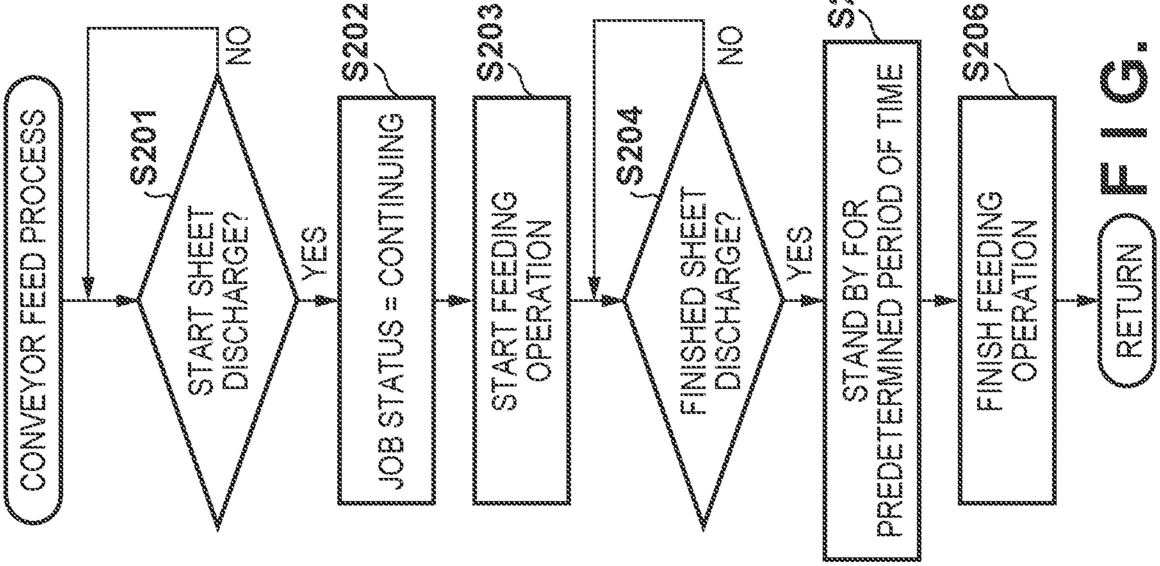
FIG. 5B is a flowchart illustrating a control example of a sheet stacking apparatus.

FIG. 5B is a flowchart illustrating an example of control of the sheet stacking apparatus 200 and illustrates a specific processing example of step S2 in FIG. 5A.

In step S201, the conveyor control unit 26 confirms whether the discharge of the sheet from the discharge unit 10 has started; if it is started, the conveyor control unit 26 proceeds to step S202, and if it is not started, the conveyor control unit 26 returns to step S201. For example, since the state ST1 of FIG. 6 is a state prior to the sheet SH1 being detected by the sheet detection sensor 24, the conveyor control unit 26 determines that the sheet discharge is not started (step S201: No). On the other hand, when the conveyance of the sheet by the discharge roller 101 progresses to the state ST2 of FIG. 6, since the leading end of the sheet SH1 is detected by the sheet detection sensor 24, the conveyor control unit 26 determines that sheet discharging is started (step S201: Yes).

In step S202, the conveyor control unit 26 updates the job status stored in a memory of the conveyor control unit 26 to "continuing". In step S203, the conveyor control unit 26 starts a feeding operation of the conveyor unit 23. Specifically, the conveyor control unit 26 drives the conveyor belt 231 by the conveyor driving roller 232. Thus, the bundle of sheets SH stacked on the conveyor belt 231 moves downstream in the conveyance direction of the conveyor belt 231 (to the left in FIG. 6). Therefore, the stacking space of the sheet SH2 being discharged is formed in a region close to the printing apparatus 100 of the conveyor belt 231 (the state ST3 of FIG. 6).

Here, acceleration of the conveyor unit 23 may be set to a value at which alignment performance of the sheet bundle stacked on the conveyor unit 23 is not ruined. Further, the conveying speed of the conveyor unit 23 can be set correspondingly to the sheet discharge speed of the discharge unit 10. For example, the conveying speed of the conveyor unit 23 may be the same speed as the sheet discharge speed of the discharge unit 10. Further, for example, the conveying speed of the conveyor unit 23 may be set to be a value within the sheet discharge speed±5 to 30% of the discharge unit 10. In other words, the conveying speed of the conveyor unit 23 may be set to a value close to the discharging speed of the sheet from the printing apparatus 100. Thus, when the conveyor unit 23 is operated correspondingly to the sheet discharging period from the printing apparatus 100, the feed amount of the conveyor unit 23 can be made close to the length of the discharged sheet.

In step S204, the conveyor control unit 26 confirms whether or not the sheet discharge has finished; the conveyor control unit 26 proceeds to step S205 if it has finished, and returns to step S204 if the sheet discharging has not finished, that is, discharging continues. The conveyor control unit 26 may determine that sheet discharging has finished based on the result of detection by the sheet detection sensor 24 switching from on to off.

The conveyor control unit 26, after waiting for a predetermined time in step S205, terminates the feeding operation of the conveyor unit 23 in step S206, and terminates the flowchart of FIG. 5B. Here, deceleration of the conveyor unit 23 may be set to a value at which alignment performance of the sheet bundle stacked on the conveyor unit 23 is not ruined.

Thus, the conveyor control unit 26 continues the feeding operation of the conveyor unit 23 while the sheet SH1 continues to be detected by the sheet detection sensor 24, that is, during the discharging of the sheet from the printing apparatus 100. On the other hand, the conveyor control unit 26, in response to the sheet SH1 no longer being detected by the sheet detection sensor 24, that is, in response to the printing apparatus 100 having finished discharging the sheet, terminates the feeding operation of the conveyor unit 23. In other words, the feeding operation of the conveyor unit 23 is executed corresponding to a time period over which the sheet detection sensor 24 detects that the printing apparatus 100 is discharging the sheet. Thus, the stacking space of the sheet discharged from the printing apparatus 100 is secured on the stacking surface (on the conveyor unit) of the sheet of the conveyor belt 231 corresponding to the period in which the sheet detection sensor 24 detects that the printing apparatus 100 is discharging the sheet.

Figure 5C:
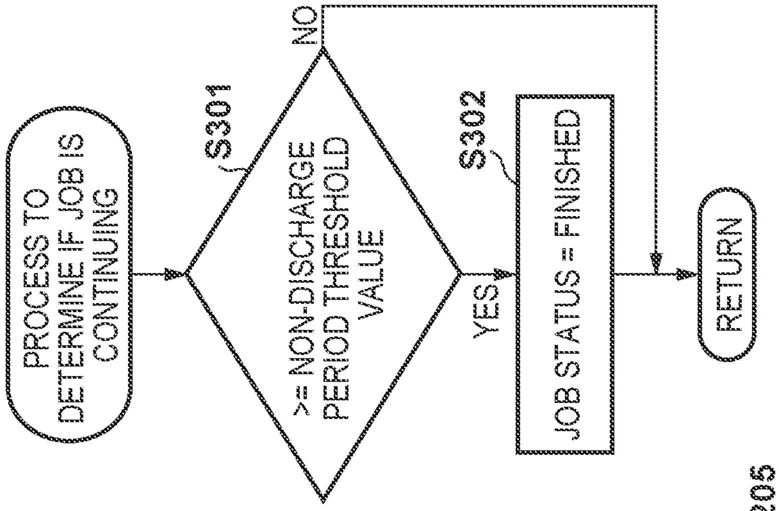
FIG. 5C is a flowchart illustrating a control example of a sheet stacking apparatus.

Returning to FIG. 5A. In step S3, the conveyor control unit 26 executes a job status determination process. FIG. 5C is a flowchart illustrating an example of control of the sheet stacking apparatus 200 and illustrates a specific processing example of step S3.

In step S301, the conveyor control unit 26 proceeds to step S302 if a period over which no sheet is discharged by the discharge unit 10 if the threshold value or more, and terminates the flowchart if it is less than the threshold value. Further, the conveyor control unit 26, if the sheet is being discharged by the discharge unit 10 or if the elapsed time since the completion of the discharge of the last discharged sheet is less than the threshold value, terminates the flowchart.

Figure 7:
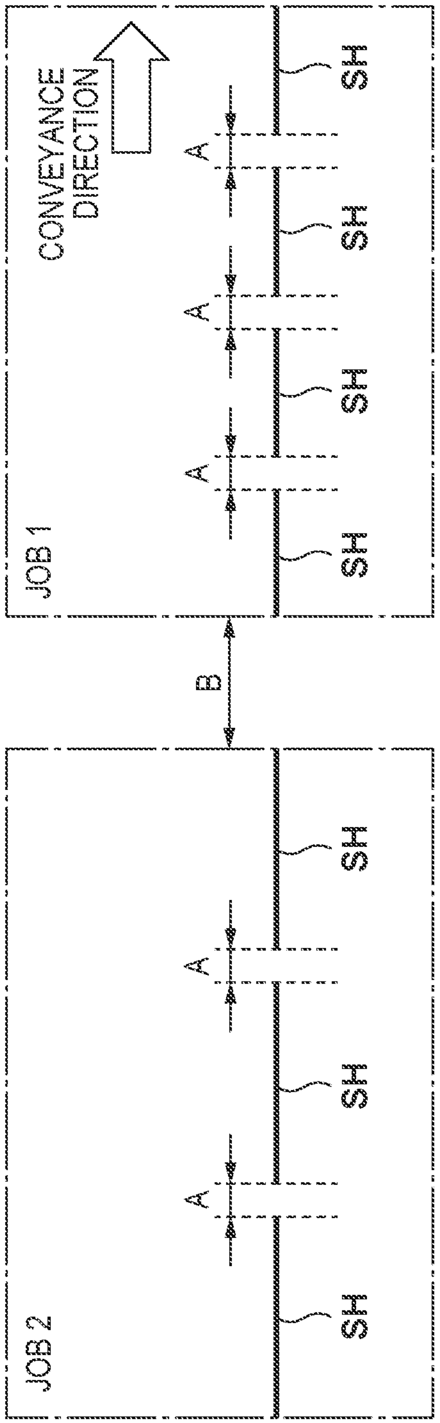
FIG. 7 is a diagram schematically illustrating an operation example of sheet conveyance when a plurality of jobs are executed.

Here, FIG. 7 schematically illustrates an operation example of sheet conveyance when a plurality of jobs are executed in the discharge unit 10. In job 1, a plurality of sheets of the same size are sequentially conveyed with a predetermined gap A therebetween. In job 2, sheets of the same size but different to the sheet size of job 1, are sequentially conveyed with a predetermined gap A therebetween. The last sheet in the print process based on the job 1 and the first sheet in the print process based on the job 2 are conveyed with a gap B therebetween. In the present embodiment, the relationship is set such that sheet gap B between different jobs>sheet gap A in the same job. Therefore, the off time of the sheet detection sensor 24, that is, the period over which no sheet is discharged by the discharge unit 10 is longer between sheets of different jobs than between sheets in the same job. Therefore, the conveyor control unit 26 can determine whether or not the job is continuing or has finished from the period over which no sheet is discharged based on the sheet detection sensor 24.

Returning to FIG. 5C. For example, when the period over which no sheet is discharged in the case where the gap between the sheets is the gap A is the period TA [sec], and the period over which no sheet is discharged in the case where the gap between the sheets is the gap B is the period TB [sec], the threshold value of step S301 may be set to a value between the period TA and the period TB.

In step S302, the conveyor control unit 26 updates the job status stored in the memory to "finished", and ends the flowchart of FIG. 5C.

Returning to FIG. 5A. In step S4, the conveyor control unit 26 confirms the job status, and if the job status is "finished", the process proceeds to step S5, and if the job status is "continuing", the flowchart is ended. For example, the conveyor control unit 26 reads out information about the job status stored in the memory and performs confirmation.

In step S5, the conveyor control unit 26 executes a discontinuous conveyor feed. Specifically, the conveyor control unit 26 drives the conveyor belt 231 by the conveyor driving roller 232 by a predetermined amount so that the sheet stacked on the conveyor unit 23 is conveyed by a predetermined amount. This operation is performed, for example, to provide a buffer between sheet bundles of different jobs (state ST5 of FIG. 6).

As described above, according to the present embodiment, the feeding operation of the conveyor unit 23 is executed correspondingly to the period in which the sheet detection sensor 24 detects that the printing apparatus 100 is discharging the sheet (step S201 to step S206). Therefore, a stacking space corresponding to the sheet length of the sheet to be detected is secured on the conveyor belt 231. Therefore, it is possible to suppress the workability of retrieval suffering due to overlapping of the sheet bundles. In addition, even when jobs in which sheets having different sheet lengths are discharged are performed successively, it is possible to appropriately control between the sheet bundles. Therefore, more sheet bundles of different sheet lengths can be stacked on the conveyor belt 231.

Further, according to the present embodiment, the conveyance period of the conveyor unit 23 is determined correspondingly to a period in which it is detected that the sheet is being discharged from the printing apparatus 100 by the sheet detection sensor 24. Further, the conveying speed of the conveyor unit 23 can be set correspondingly to the sheet discharge speed of the discharge unit 10. Therefore, the feed amount of the conveyor unit 23 is set based on the sheet discharge period and the sheet discharge speed of the discharge unit 10. Therefore, the feed amount of the conveyor unit 23 can be an amount corresponding to the length of the sheet to be discharged. More specifically, since the feed amount of the conveyor unit 23 is set based on the discharge period (time) from the sheet printing apparatus 100×the sheet discharge speed, the feed amount of the conveyor unit 23 can be made close to the length of the sheet. Therefore, it is possible to close the distance between the sheet bundles stacked on the conveyor unit 23, and it is possible to increase the number of stacked sheets on the conveyor unit 23.

Further, according to the present embodiment, the conveyor control unit 26, based on the detection result of the sheet detection sensor 24, secures sheet stacking space corresponding to the sheet length. Therefore, when the sheet stacking apparatus 200 is added to the printing apparatus 100, the conveyor control unit 26 does not need to receive information such as the length of the sheet from the control unit 13 of the printing apparatus 100. Therefore, the conveyor control unit 26 can control the operation of the conveyor unit 23 in a simpler manner.

Other Embodiments

In the above embodiment, the sheet detection sensor 24 detects whether or not the printing apparatus 100 is discharging a sheet, but whether or not the printing apparatus 100 is discharging a sheet may be detected in other manners. For example, whether or not the printing apparatus 100 is discharging the sheet may be detected based on the driving information of the discharge roller 101 of the discharge unit 10. The driving information of the discharge roller 101 may be a driving current value of the discharge roller 101 or a detection result of an encoder capable of measuring a rotational speed of the discharge roller 101. For example, the conveyor control unit 26 may acquire the driving information of the discharge roller 101 from the control unit 13 and control the feeding operation of the conveyor unit 23 in correspondence with a period in which the discharge roller 101 is being driven, that is, a period in which the printing apparatus 100 is discharging the sheet.

In the above embodiment, the printing system SY is configured by the printing apparatus 100 and the sheet stacking apparatus 200, but a sheet stacking apparatus may be provided as a part of the printing apparatus. In this case, configuration may be such that the conveyor control unit 26 is not provided, and the control unit 13 of the printing apparatus 100 may control the operation of the conveyor unit 23.

In the description of the above embodiment, a combination of one printing apparatus 100 and one sheet stacking apparatus 200 has been described, but when there is a plurality of discharge units 10 in one printing apparatus 100, a plurality of sheet stacking apparatuses 200 may be provided. In this case, it is possible to align and stack the sheets in a plurality of sheet stacking apparatuses 200.

In the description of the above embodiment, a combination of one printing apparatus 100 and one sheet stacking apparatus 200 has been described, but a plurality of printing apparatuses 100 and a plurality of sheet stacking apparatuses 200 may be provided. In this case, conveyors may be extended for the plurality of sheet stacking apparatuses 200, and a plurality of sheet stacking apparatus 200 may be disposed so as to collect the end points of the conveyors in one place. Thus, the sheets stacked in an aligned manner will be collected in one place. As a result, sheets discharged from the plurality of printing apparatuses 100 can be easily advanced to post-processing.

The invention may also be realized in a process in which a program for implementing a function of one or more of the above described embodiments is supplied to a system or device via a network or storage medium, and one or more processors in the computer of the system or device read and execute the program. It can also be implemented by circuits (e.g., ASIC) that implement one or more functions.

The invention is not limited to the embodiments described above, and various modifications and variations are possible without departing from the spirit and scope of the invention. Accordingly, the claims are appended hereto in order to make the scope of the invention public.

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2020-212773, filed Dec. 22, 2020, which is hereby incorporated by reference herein in its entirety.

What is claimed is:

1. A sheet stacking apparatus comprising:

a conveyor unit configured to perform stacking of sheets discharged from a printing apparatus and conveying of stacked sheets;

a detection unit configured to detect discharging of a sheet from the printing apparatus; and a control unit configured to: (1) in a case where the detection unit detects discharging of a first sheet of a print job from the printing apparatus, start a feeding operation of the conveyor unit, and (2) in a case where the detection unit does not detect the discharging of the first sheet after the control unit starts the feeding operation, terminate the feeding operation.

2. The sheet stacking apparatus according to claim 1, wherein in a case where a plurality of sheets is discharged from the printing apparatus according to the print job, even if the detection unit detects that the printing apparatus is discharging a subsequent sheet discharged after the first sheet of the print job, the control unit does not start the feeding operation of the conveyor unit.

3. The sheet stacking apparatus according to claim 1, wherein the control unit, in a case where discharging of sheets from the printing apparatus based on the print job has finished, executes the feeding operation of the conveyor unit by a predetermined amount.

4. The sheet stacking apparatus according to claim 1, wherein the control unit executes the feeding operation of the conveyor unit at a conveying speed of the conveyor unit based on a speed at which a sheet is discharged from the printing apparatus.

5. The sheet stacking apparatus according to claim 1, wherein the detection unit is provided downstream of a discharge unit of the printing apparatus in a discharging direction of the sheet so as to detect the sheet.

6. The sheet stacking apparatus according to claim 1, wherein the detection unit detects whether a discharge unit of the printing apparatus is driven.

* * * * *